Dec. 8, 1964   R. P. KUMFERMAN   3,160,223
VEHICULAR STEERING
Filed Sept. 8, 1961   6 Sheets-Sheet 3
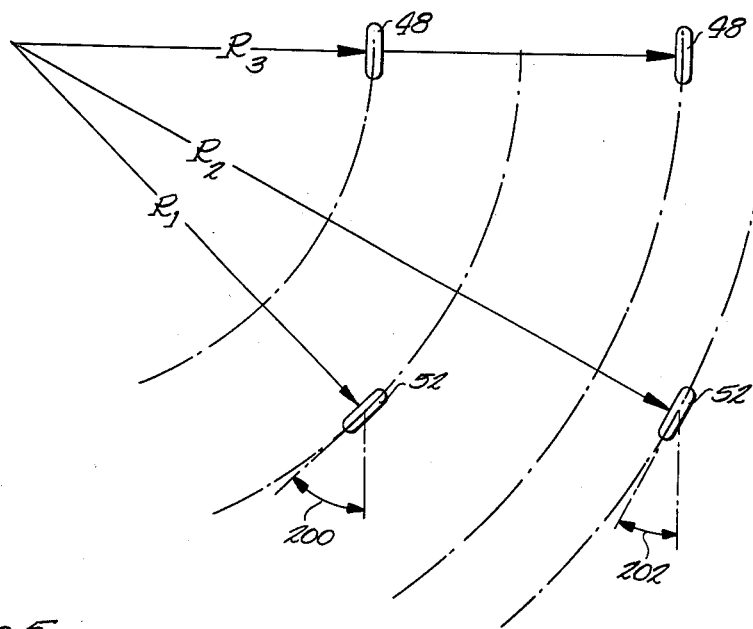
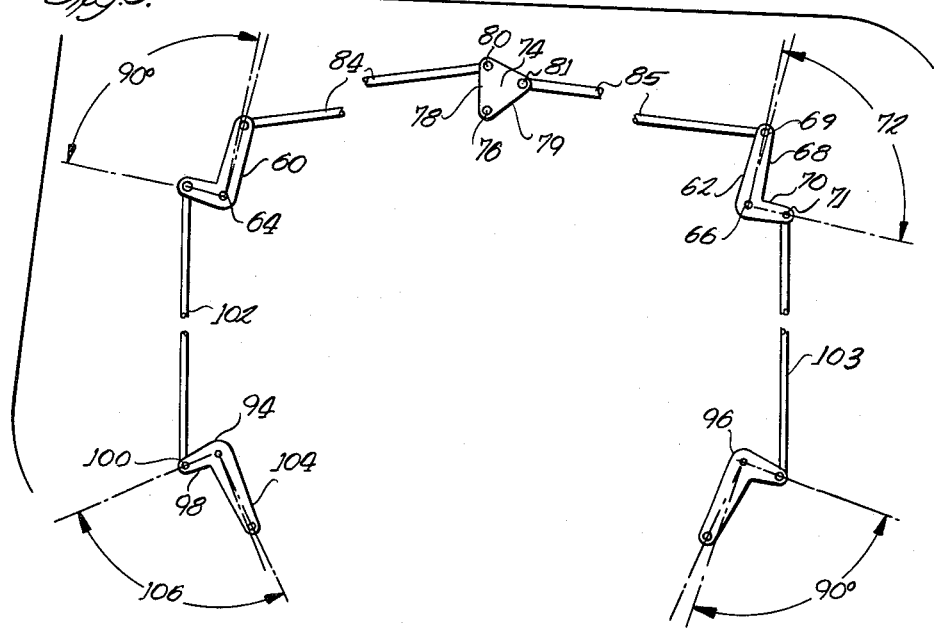
Inventor
Robert P. Kumferman
Dominik, Lazo & Korth
Attorneys

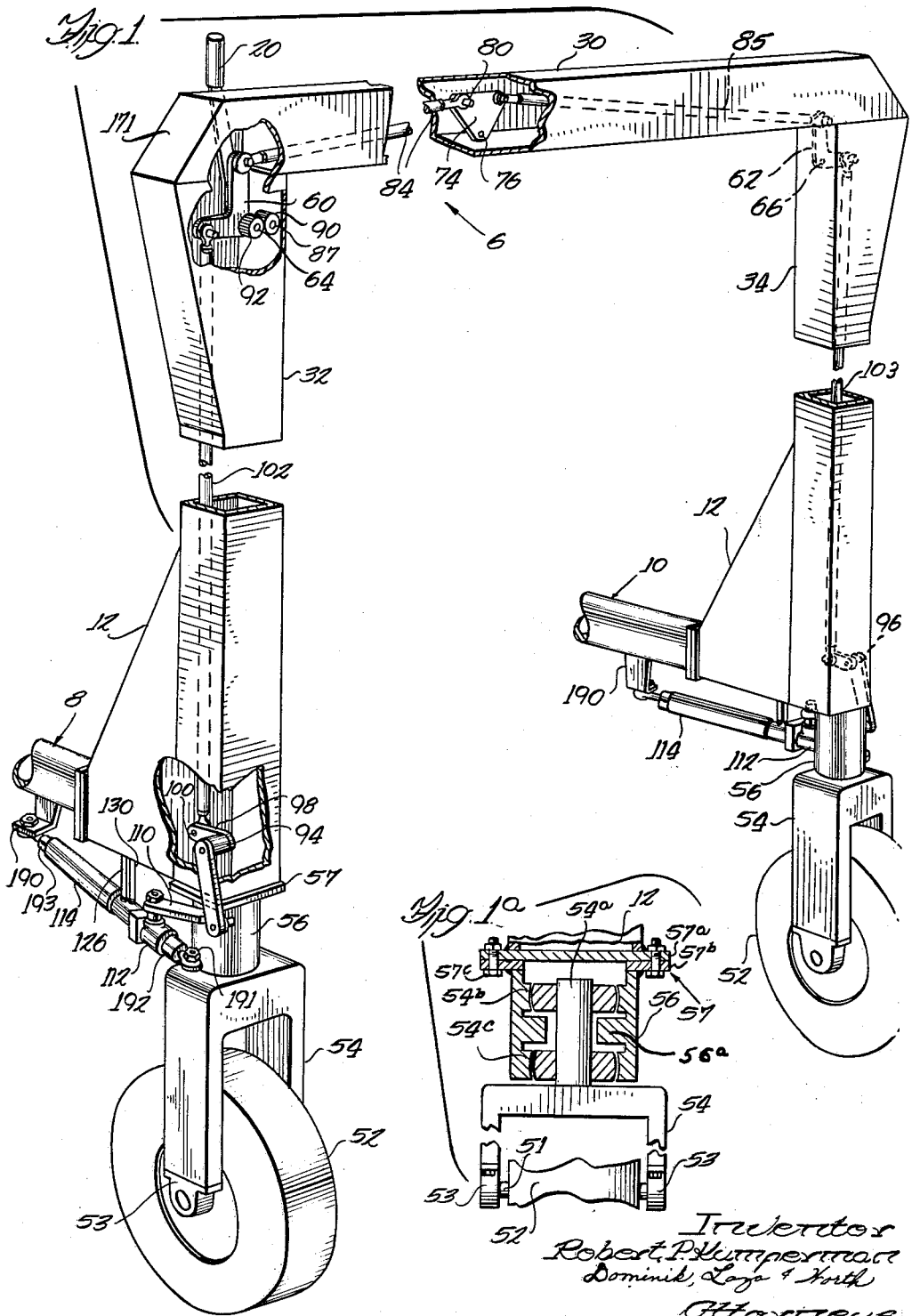

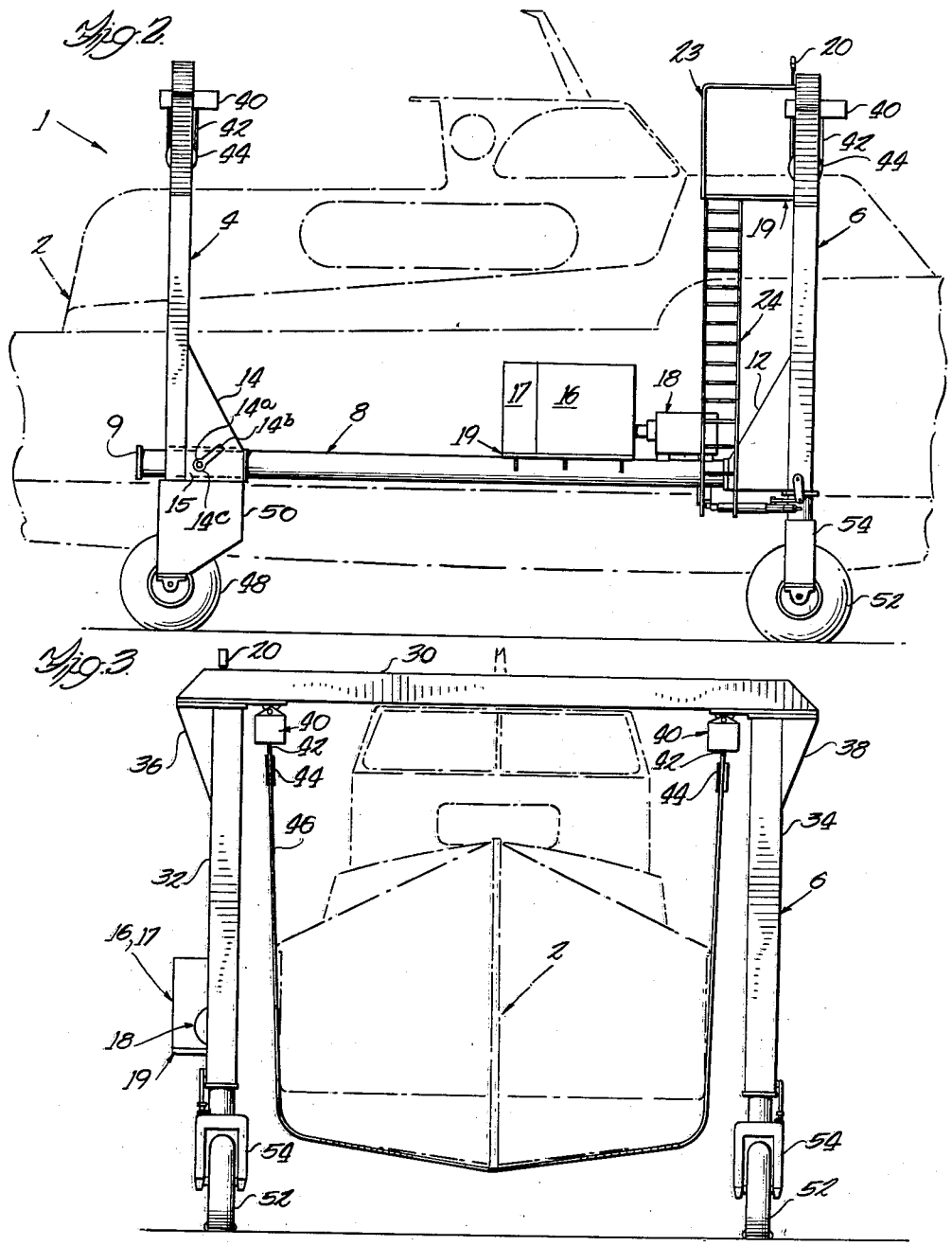

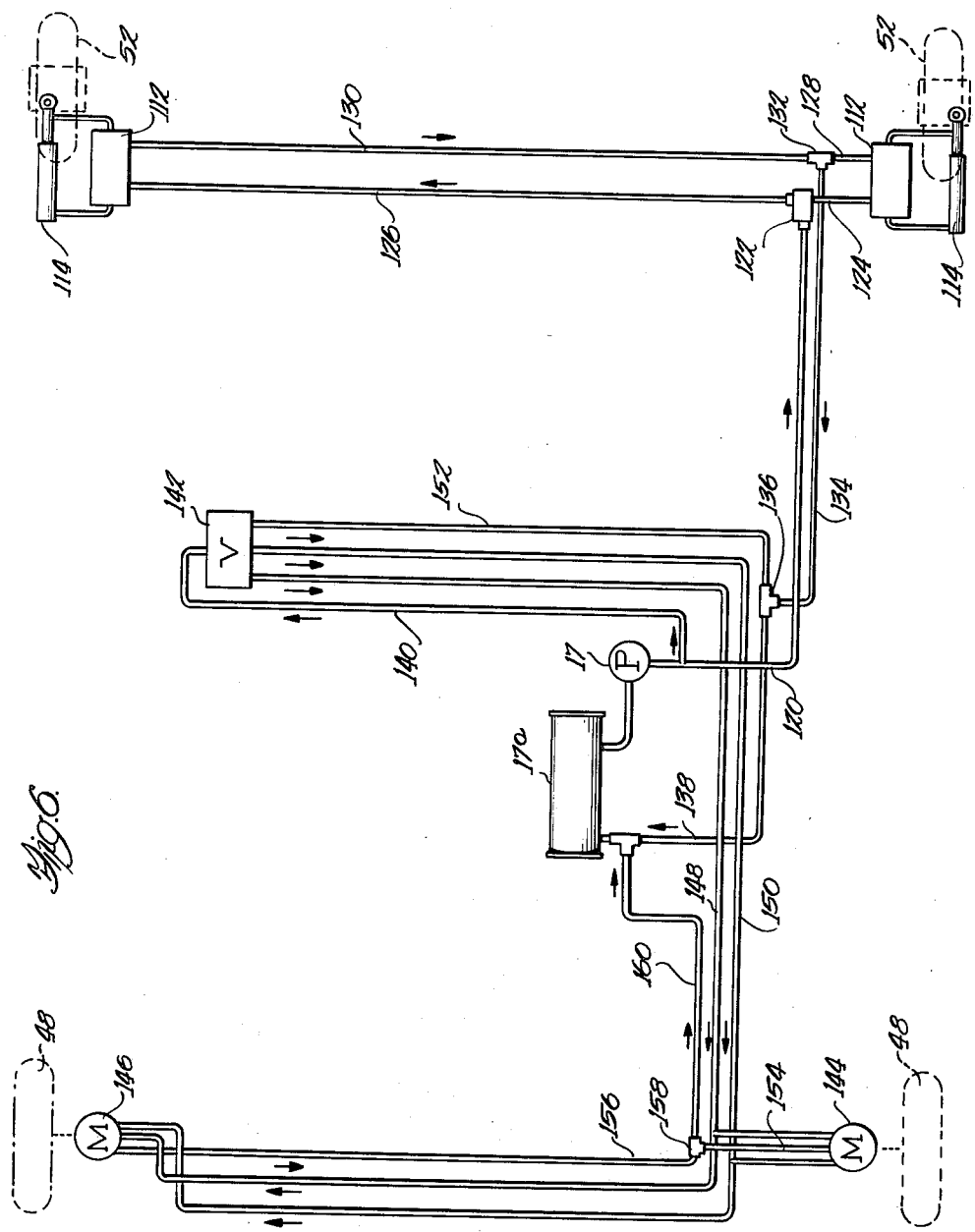

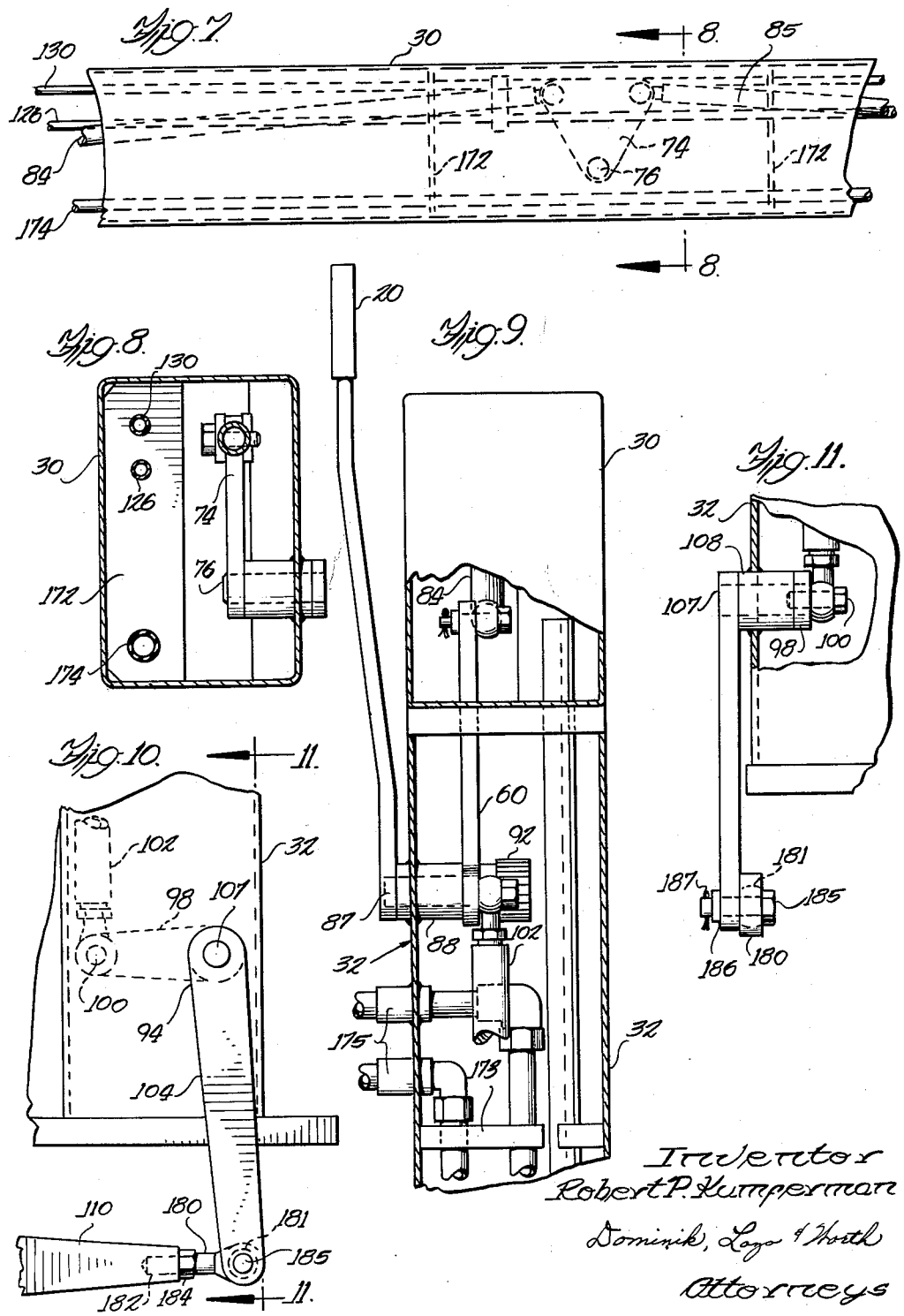

Dec. 8, 1964   R. P. KUMFERMAN   3,160,223
VEHICULAR STEERING

Filed Sept. 8, 1961   6 Sheets-Sheet 6

Inventor
Robert P. Kumferman
Dominik, Lazo & North
Attorneys

United States Patent Office 3,160,223
Patented Dec. 8, 1964

3,160,223
VEHICULAR STEERING
Robert P. Kumferman, Menomonee Falls, Wis., assignor to Renner Manufacturing Company, Milwaukee, Wis.
Filed Sept. 8, 1961, Ser. No. 136,940
14 Claims. (Cl. 180—79.2)

This invention relates to a means for steering self propelled vehicles and is particularly adapted to such a steering means for that class of vehicles denominated as a straddle truck. More particularly, the invention relates to a steering means for a straddle truck whereby a differential action is obtained between the wheels which are turned in order to guide the straddle truck.

Straddle trucks are generally characterized by a construction that enables them to straddle the load to be carried. For the purposes of this invention, straddle trucks are characterized by a frame having depending legs with an open area between the legs at the front of the truck and the legs at the rear of the truck. In use, this construction permits the truck to be positioned with the load between the legs whereby the load can be engaged, lifted, carried by the truck to a desired place, and then lowered.

Straddle trucks are advantageous in the handling of elongated loads, bulky loads, loads requiring delicate handling particularly if long or bulky, and other loads. It is becoming increasingly common to find vehicles of the straddle truck class being used to handle loads of lumber, boats, for positioning highway trailers on railway flatcars on "piggyback" operations and for many other uses.

Some straddle trucks are not self propelled, being drawn by a suitable prime mover such as a tractor. However, self propelled straddle trucks are the subject matter of the present invention. As the self propelled straddle trucks become increasingly larger for handling more bulky and/or larger loads, it becomes increasingly desirable if not absolutely necessary that the steering mechanism have a differential-like action in order to facilitate turning and also to reduce the stresses on the structure. The latter becomes of increasing importance when it is realized that the structure of the straddle truck ordinarily includes a pair of inverted U-shaped frame members which are respectively located at the front and the rear of the vehicle. The only connection between the legs of each of the inverted U-shaped frame members is at the top. There is no connection between the legs of the frame members at the bottom because of the necessity that the legs be able to straddle a load.

The foregoing describes generally the structure of a straddle truck of the class under consideration. In the preferred embodiment, drive or traction wheels are supported underneath the legs of the rear-most of the two inverted U-shaped members, while guide wheels are supported for rotation underneath the respective legs of the front frame member. The guide wheels are linked to the rest of the steering system. When the vehicle is turned, the respective wheels each tend to move through its individual turning circle.

Speaking now with reference to the guide wheels, a strain is thrown on the entire straddle truck in the course of turning because of the friction forces between the respective wheels and the ground. This strain is increased if the guide wheels are turned away from neutral the same amount, because, for example, the wheel on the outside of the turn is not tangent to its turning circle whereby the friction forces are greater and the entire structure of the straddle truck is placed under a twisting action.

It is an object of this invention to provide for a self propelled straddle truck a steering means having a differential action such that the guide wheels are turned to be tangential to their respective turning circles, thereby to minimize the turning strain on the structure of the straddle truck.

It is another object of the invention to provide for a self propelled straddle truck a steering means having a differential action whereby in the course of turning the truck that guide wheel on the inside of the turn is rotated out of the straight-ahead or neutral position more than is the wheel on the outside of the turn, speaking with reference to those wheels which are moved to effect turning.

It is another object of the invention to provide for a straddle truck a steering means having a differential action.

It is still another object of the invention to provide a steering means for a straddle truck whereby an open area is maintained between the straddling legs.

Included in the objects of the invention is the provision of a steering means so constructed and arranged as to offer protection against the weather. Still another object of the invention is to accomplish one or more of the foregoing objects in combination.

A specific embodiment of the invention includes a series of alternately arranged connecting rods and bell cranks which are supported entirely from the front one of the inverted U-shaped frame members in such a fashion that the space is left open between the legs thereof. The connecting rods and bell cranks are associated with a lever for the operator to position them, thereby to move the guide wheels to a position suitable for turning and with the differential action. As will be described in further detail, the preferred embodiment includes bell cranks with the arms arranged at such angles and of such proportions that the differential action is obtained.

Other objects, advantages and features of the invention will become evident from reading the following description in conjunction with the associated drawings wherein:

FIG. 1 is a perspective partially cutaway front view of the assembled steering means enclosed within the associated inverted U-shaped member.

FIG. 1a is a cross-section of a detail of the guide wheel mounting.

FIG. 2 is a right hand side elevation showing the general organization of an assembled straddle truck including a self propelling means, the disposition of the steering means, and further showing in phantom lines a boat as carried by the straddle truck.

FIG. 3 is a front elevation view showing the general organization further including a suitable load-lifting and carrying arrangement and in phantom lines showing the boat of FIG. 2.

FIG. 4 is a schematic top plan view of the drive wheels, guide wheels, their respective turning circles, and related matters.

FIG. 5 is an isolated simplified front elevation view of the steering linkage showing only bell cranks, connecting rods, orientation of pivot points, bell crank arm relationships, and the like.

FIG. 6 is a schematic layout of a suitable hydraulic system for driving and steering the straddle truck.

FIG. 7 is a front view of the central portion of the cross piece of the frame member of FIG. 1 and further shows the relationship of the steering mechanism, the hydraulic lines, and the crosspiece when the latter encloses the mechanism and the lines.

FIG. 8 is a sectional view through 8—8 of FIG. 7.

FIG. 9 is a side view in section of the upper right hand corner of the inverted U-shaped frame member of FIG. 1.

FIG. 10 is a partial side view of the bell crank at the bottom of the depending legs of FIG. 1.

FIG. 11 is a partial front view of the bell crank of FIG. 10 as seen along the section 11—11 of FIG. 10.

Throughout the drawings the same reference numerals refer to the same parts.

Figure 12:
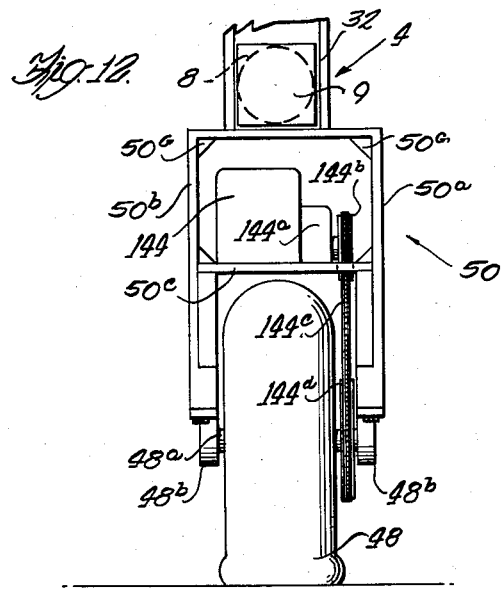
FIG. 12 is a rear elevation view of a rear or driving wheel, showing the hydraulic motor mounting and connection to the drive wheel.

Also, throughout the drawings "left hand" and "right hand" designate the sides of the straddle truck with respect to the operator when in normal operating position, in the fashion as used when discussing an ordinary automobile.

General

Referring to FIGS. 1, 2, and 3, there is shown the general organization of a straddle truck 1 to which the vehicular steering means according to the invention may be applied. The straddle truck is shown in FIGS. 2 and 3 as carrying a boat 2 which is shown generally in phantom lines.

The straddle truck 1 includes a rear end inverted U-shaped frame member 4 and a front end inverted U-shaped frame member 6. The respective frame members 4 and 6 are generally constructed alike, as further discussed below. The two frame members are horizontally spaced apart by the respective stringers 8, 10 which extend between the corresponding left hand legs and right hand legs of the frame members, respectively. Corner braces 12 are provided at the connection between the respective stringers and the corresponding legs of the front frame member 6. Rear end corner braces 14 are provided in similar fashion. The respective corner braces serve to increase the strength of the straddle truck structure.

The straddle truck 1 is also provided with a self propelling means which is shown as mounted on the right hand stringer and includes an internal combustion engine 16, which is preferably of the spark ignition type. The engine drives a conventional hydraulic pump denoted generally as 17 and also drives an electric generator 18. The hydraulic pump, as hereinafter discussed, provides the power for driving and for steering the straddle truck. The electric generator provides power for operation of the hoisting equipment. If desired, an all hydraulic system for driving, steering and hoisting may be provided, or alternatively an all electric system can be provided. However, the first-stated combination is preferable. An operator's platform 19 is supported from the front frame member 6 whereby the operator can operate the steering lever 20. As will be further described below, the lever 20 is a portion of the selectively positionable means for engaging and positioning the respective portions of the steering mechanism. A handrail assembly 23 surrounds the platform as a safety feature and a ladder 24 depends from the platform to a position conveniently adjacent the ground.

Generally speaking, the inverted U-shaped frame members are constructed alike. The description will initially be made with reference to the front frame member 6 of FIGS. 1 and 3. The frame member comprises a cross piece 30 from which depends the legs 32, 34. In order to secure additional strength, top corner braces 36, 38 are provided between the depending legs and the outboard end of the cross piece. Hoists 40 are swingably secured from the cross piece, preferably at a location closely adjacent the respective legs but still between the legs. The hoists, as stated above, preferably have an electric motor associated therewith for purposes of lifting the load such as the boat 2. Each hoist has its own individual motor. A hoist chain or cable 42 is connected between the hoist and one or more pulleys 44, being reeved in such fashion as to increase the mechanical advantage preferably by 3 to 1. A suitable belt or cable assembly 46 is connected between the pulleys 44 associated with each frame member. As will be observed from FIGS. 2 and 3, there are a total of 4 hoists and their respective drive motors and associated chains and pulleys. In operation, all of these hoists are operated simultaneously or separately whereby the load such as the boat 2 is gently lifted from its previous resting place, or alternatively is lowered to a selected position. In this fashion both ends of the load are either raised or lowered at the same time.

The rear frame member 4 has a drive wheel 48 supported below each of the respective legs. The drive is positioned so that it drives the straddle truck forward, that is in a direction corresponding to the longitudinal axis of the stringers 8, 10. The drive wheels are connected by suitable means to the hydraulic pump 17, as will appear with respect to FIG. 6, discussed below. Each drive wheel is supported on a short axle which extends between a pair of brackets 50. One pair of brackets 50 is provided at the bottom of each leg of the rear frame member 4.

Underneath each leg of the front frame member 6, there is supported a guide wheel 52. Each of the guide wheels is supported so that it can revolve through a horizontal arc in order that the straddle truck can be steered. The means for mounting the guide wheels so that they pivot through such respective horizontal arcs is the same for both guide wheels and includes, for each guide wheel, an inverted U-shaped bracket 54.

As best seen in FIG. 2, the rear end of the respective stringers 8 and 10 (only 8 being shown for clarity) is constructed so that the entire rear frame member 4 can be advanced along the stringers to lengthen or shorten the wheel base in accordance with the characteristics of the load. To this end, an enlarged cap 9 is bolted or otherwise secured on the end of the stringer 8. It is to be understood that the stringer 10 and its cooperating parts are constructed in like fashion. The stringer 8 extends completely through the bracket portion 14 and the lower end of the inverted U-shaped frame member 4. In the preferred embodiment, both stringers 8 and 10 are tubular, thus presenting a cylindrical external configuration. Accordingly, the stringer 8 (and 10) is received in a like-shaped conduit 15 which is secured inside the rear frame member 4 and its bracket 14. The stringer 8 is slidably received inside the member 15.

The stringer is secured in place relative to the rear frame member 4 by a clamp assembly comprising a threaded bolt 14a to the outboard end of which is welded a handle 14b. The bolt 14a extends completely through the wall of the bracket 14 and the member 15 and threadedly engages the bracket by means of either a tapped hole or the nut 14c, which latter if used is welded to the bracket 14.

In normal operation, the clamp comprising members 14a–14c is turned so that the end of bolt 14a is forced in clamping relation against the side of stringer 8. The same construction, of course, applies to the stringer 10.

When it is desired to shorten the straddle truck, the clamp is loosened by turning handle 14b and power is applied to the traction wheels 48, thereby advancing the entire rear frame member 4 relative to the stringers 8, 10. This procedure is facilitated by putting chocks in front of the wheels 52 at the front end of the straddle truck. When the rear frame member 4 has reached the appropriate position, power is cut off and the clamps 14a–14c are tightened. It will be observed that the truck can be lengthened or shortened by this procedure. When lengthening the same, the cap 9 serves as a rear stop member. If desired, a forward stop member in the form of a collar or the like can be welded to one or both of the stringers.

Operation of the straddle truck will be described in more detail below. However, the straddle truck is driven along the ground by applying hydraulic fluid from the pump 17 to the drive wheels 48. The truck is steered by selectively positioning the steering lever 20, thereby operating a suitable steering mechanism and causing the wheels 52 to be turned through horizontal arcs and thereby swung around corners, turns and the like.

Steering Linkage

In its preferred embodiment, the steering linkage is symmetrical about a vertical line drawn through the midpoint of the cross piece 30, as viewed in FIG. 3. The symmetrical location of the steering linkage is also illustrated schematically in FIG. 5. Referring for a moment to FIG. 4, the steering linkage is constructed and arranged so that the respective guide wheels 52 are rotated through different horizontal arcs so that each guide wheel is tangential to its respective turning circle. In this fashion, the wheel 52 on the outside of the turn is rotated through a smaller arc during the course of turning than is the other guide wheel, which is on the inside of the turn. However, the drive wheels 48 remain in position and track as indicated by the positions of the guide wheels. In this discussion, the terms right hand and left hand refer to those sides of the straddle truck 1 in accordance with automotive terminology, i.e. they are the sides as would appear to the operator when the vehicle is moving forward, or to the right as seen in FIG. 2.

Referring now most particularly to FIGS. 1 and 5, there are shown, respectively, right hand and left hand upper bell cranks 60, 62 which are pivotally supported in mirror image relationship from the front inverted U-shaped frame member 6. The pivot points of the respective bell cranks 64, 66 are located closely adjacent the intersections of the cross piece 30 with its respective right and left hand legs 32, 34. The bell cranks 60, 62 are preferably constructed alike, and for convenience only the left hand crank will be described. The left hand bell crank 62 comprises a long generally vertical arm 68 and a short generally horizontal arm 70. The two arms are of different radii and also have an obtuse angle 72 between the axes of the pivot points between them. At the end of each of the bell crank arms is a pivot means 69, 71 for the long and short arms, respectively.

A central bell crank 74 is pivotally supported from the cross piece 30 at a position intermediate the upper bell cranks 60, 62. The pivot 76 is preferably located halfway between the upper bell crank pivots 64, 66. The central crank has two arms 78, 79 of equal length. The pivot points 80, 81 at the end of the respective arms are so located that they are disposed vertically above a line drawn between the long vertical arms of the upper bell cranks 60, 62 when the upper bell cranks are disposed in the neutral or straight ahead position. It is also preferred that the central bell crank pivot 76 be disposed above the upper bell crank long vertical arm pivots.

A right hand upper connecting rod 84 is connected between the central bell crank arm pivot 80 and the pivot at the end of the long arm of the right hand upper bell crank 60. A left hand upper connecting rod 85 is connected between the pivot points 69 and 81 on the left hand upper bell crank 62 and the central bell crank 74, respectively. The connecting rods are revolvably connected to the pivots at the opposite ends thereof. In the preferred embodiment, when the steering linkage means is in the neutral position so that the straddle truck is driving straight ahead, the upper connecting rods 84, 85 slope upward from the bell crank to which they are attached toward the central bell crank.

Referring now to FIGS. 1 and 9, the steering lever 20 is secured as by welding to one end of the steering lever shaft 87 which is revolvably supported in a journal 88 that is secured as by welding or brazing to the leg 32. A steering gear 90, preferably comprising a spur gear, is secured as by welding, keying, or other suitable means to the other end of the shaft 87. The journal 88 supports the steering gear to mesh with a mating steering pinion 92 which is secured to rotate about the pivot 64 of the upper right hand bell crank 60. In fact, the steering pinion 92 rotates in unison with and is secured to the upper right hand bell crank. Thus, it is to be observed that turning the lever 20 to one side or the other will cause the bell crank 60 to rotate an amount corresponding to that indicated by the two gears 90, 92. In consequence of the pivoting of the bell crank 60, the mechanism connected to 60 will likewise move, to the end that the guide wheels 52 will be positioned as discussed above and illustrated in FIG. 4, for example. The mechanical and hydraulic systems are so constructed that turning lever 20 to the operator's right steers the straddle truck 1 to the right and similarly for turning left.

Disposed adjacent the lower end of the respective legs 32, 34 are the right hand and left hand lower bell cranks 94, 96 respectively. As best seen in FIG. 1, the lower bell cranks pivot in a plane which is disposed at about 90° to the plane in which the upper and central bell cranks rotate. This is so that the motion can be properly transferred to the hydraulic control components of the steering system, as will be hereinafter described in more detail. However, FIG. 5 illustrates the lower bell cranks schematically as being in the same plane, it being understood that FIG. 1 represents the preferred embodiment. The lower bell crank construction is also shown in FIGS. 10 and 11, where it is observed that the respective arms are offset with respect to each other whereby one arm is disposed inside the box-like construction of the inverted U-shaped frame member and the other arm is disposed outside the same. Referring to FIGS. 1, 5, 10 and 11 and more specifically referring to the lower right bell crank 94, it is seen that crank 94 comprises a short generally horizontally disposed inside arm 98 having a pivot connection 100 at the end thereof. A generally vertical right hand connecting rod 102 is connected between the pivot 100 and the short arm pivot on the upper right hand bell crank 64.

A generally vertically disposed long crank arm 104 of the right hand lower crank is disposed at an obtuse angle 106 with respect to the short arm 98. The long arm is offset from arm 98, as best seen in FIGS. 1 and 11, the two arms being respectively bolted, welded, keyed or otherwise secured to the opposite end of an offsetting shaft 107 which extends between the two and is journaled in an appropriate bearing 108 which is in turn affixed to the depending leg 32.

The left hand lower bell crank 96 is constructed in a similar fashion, but differs in that it is the mirror image of the right hand crank 94. The lower left hand crank 96 is mounted in mirror image fashion, being revolvably secured about its shaft or pivot point (i.e. corresponding to shaft 106) to revolve adjacent the lower end of the frame leg 34. A left hand vertical connecting rod 103 extends from the short arm of the bell crank 96 upwardly to the arm 70, being revolvably attached at each end to the respective arms. The steering linkage is symmetric about the pivot 76 with the angles between the arms of the two lower bell cranks 94, 96 equal and the angles between the arms of the two upper bell cranks 60, 62 also equal. However, it should be obvious that the rotation of the pivot points 80 and 81 on plate 74 about pivot 76 will produce a different linear motion at the outer ends of rods 84 and 85. If the plate is rotated clockwise as seen in FIG. 5, the outer end of connecting rod 84 will be moved a greater distance than the outer end of connecting rod 85. The motion of the connecting rods is transferred to the lower bell cranks producing a greater motion in the long arm of bell crank 94 than in the long arm of bell crank 96. This difference in motion is used to provide the different motion in the turning radius of the two wheels.

Although the hydraulic system is described next in considerable detail, it is well to point out at this time that the two lower bell cranks are respectively connected mechanically into the hydraulic system whereby the motions of the steering linkage are translated into turning of the guide wheels by means of adjusting a hydraulic valve corresponding to the amount of turning desired, and thus admitting an appropriate amount of hydraulic fluid to one end or the other of a hydraulic cylinder. The drag links 110 (see FIGS. 1, 10 and 11) are revolvably connected at one end to the long arm of the respective lower bell cranks and at the other end are connected to a conventional "spool" control valve assembly 112. Thus, motion of the lower bell cranks is transmitted through the drag links 110 to position the control valves assemblies 112. The control valve assembly is secured to the hydraulic cylinder assembly 114. The assembly of value 112 and cylinder 114 is pivotally secured at one end to the stringer 8 and at the other end to the guide wheel bracket 54.

Hydraulic System

As discussed above, a portion of the hydraulic components are linked into the steering system. Most particularly, the components so concerned are the valves 112 and the cylinders 114, there being one each for the respective right and left hand sides of the straddle truck.

Referring now particularly to FIG. 6, the hydraulic system for use with one embodiment of the invention is illustrated schematically and shows the hydraulic pump 17 connected to receive hydraulic fluid from the reservoir 17A. The pump discharges into the steering system and to the drive system. The steering system is discussed first.

The pump discharges into the high pressure common supply line 120 for the steering system. The hydraulic fluid flows through 120 to the flow splitter or T 122 at which point the high pressure fluid is directed to the right hand wheel control through line 124 and to the left hand wheel control through the line 126. The high pressure fluid through line 124 is first directed into the control valve 112 which directs the fluids into one end or the other of the hydraulic cylinder 114 to either push the right hand wheel for a left turn or to pull it for a right turn. A corresponding action occurs in reverse direction for the left hand wheel. The cylinders 114 are double acting. The control valve 112 also opens a return line from each of the cylinders 114, whereby low pressure exhaust fluid is removed via the respective right and left hand return lines 128, 130. The return lines 128 and 130 join at the T 132 whereby fluid returning is then directed through a return line 134 to join with the return flow from the drive system at the T 136 and to travel thence to the reservoir 17A through line 138.

The just described components and those hereafter described are all conventional hydraulic components and no invention is claimed in any of them per se. The hydraulic pump also discharges into the high pressure drive supply line 140 which feeds the hydraulic fluid to the conventional manual drive wheel motor control valve 142. The operator manipulates valve 142 to forward, reverse, or neutral positions. Hydraulic fluid under high pressure is directed from the valve 142 to the hydraulic motors 144, 146 on the right and left hand sides, respectively. The hydraulic motors are connected by conventional coupling means to the drive wheels 48. In accordance with the setting of valve 142, the individual high pressure lines 148, 150 alternatively supply the high pressure fluid to the motors for forward drive or for reverse drive. Arrows show the flow direction for each line 148, 150 when supplying fluid to the motors. Forward drive fluid is supplied via conduit 148, the flow being split at conventional T connections and directed into the respective motors, the return to reservoir being via line 150. A similar flow path and split is provided for the reverse drive supply conduit 150, and return through 148 (opposite 148 arrow).

The control valve 142 also bypasses fluid to exhaust when excess fluid is provided, as for example when the motors are not being driven at full capacity or when idling. The bypass conduit 152 directs the fluid from the valve 142 to the T connection 136, thence to the reservoir. The exhaust connections from the respective motors 144, 146 are through one of conduits 148, 150. A leakage collection system comprises conduits 154 and 156 which join at the T 158 to form a common return conduit 160 to the reservoir 17A.

Details

FIG. 1a shows a cross section of a typical detail through the guide wheels. This is designed so that the wheels will not drop out when they go over a low spot in the ground. As seen in FIG. 1a, each leg of the bracket 54 has a pillow block 53 bolted to the bottom of each leg and an axle 51 extends between the two pillow blocks on each leg. The wheel 52 is supported on the axle.

The spindle 54a extends upwardly from the bracket 54 into the journal housing 56 where it is revolvably mounted by means of an upper bearing 54b and a lower bearing 54c which are maintained in spaced-apart relationship along the spindle by the shank collar 56a which is welded or otherwise secured to the inside of the housing. Both the upper and lower bearings are preferably of the spherical variety in order that both radical and thrust loads are accommodated. Anti-friction bearings may be used if desired. During manufacture, the lower bearing is pressed on the spindle, the upper end of the spindle inserted in the housing and the upper bearing pressed thereon. The plate 57 is an assembly of spindle housing flange 57b, leg bearing plate 57a, and nut-and-bolt assemblies 57c for securing the same together. Flange 57b and plate 57a are respectively welded or othewise fixed to the housing 56 and to the bottom of the legs 32, 34.

Figure 13:
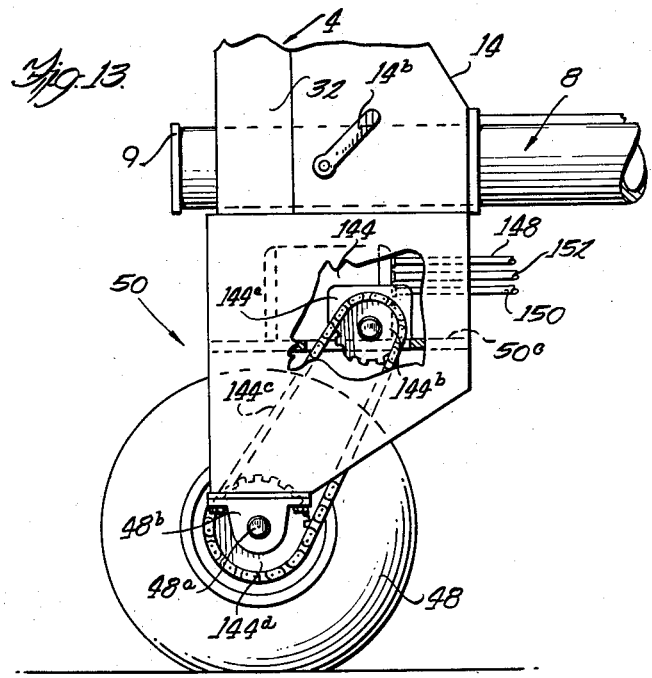
FIG. 13 is a side elevation view of FIG. 12 with parts broken away.

As evident from FIGS. 2, 12, and 13, the rear brackets 50 each depend from bracket 14 and each has a pillow block 48b mounted thereon. A pair of bracket plates 50a, 50b is disposed one on each side of the respective wheel 48. The wheel 48 and a sprocket 144d are both keyed or otherwise secured to the axle 48a so they rotate in unison. The axle 48a is revolvably mounted between pillow blocks 48b which are at the bottom of the bracket plates 50a, 50b.

A motor base plate 50c extends transversely and horizontally between the bracket plates. Gussets 50g aid in supporting plate 50c in place. Gusset plates are also employed for supporting the top plate of the bracket assembly 50, which extends horizontally across the tops of the bracket plate (see FIG. 12).

The hydraulic motor 144 is attached to the plate 50c. Preferably, a transmission such as a worm gear drive 144a is disposed between the motor and a motor sprocket 144b. A chain 144c connects motor sprocket 144b with the wheel sprocket 144d. Hydraulic lines 148, 150 and 152 are provided, connected in circuit as shown in FIG. 6.

The lifting means 40–44 are reeved in any conventional way to yield the desired mechanical advantage.

As is evident from FIGS. 1–3 and 7–11, the various inverted U-shaped frame members are respectively of welded box-like construction and have hollow interiors. The steering linkage is preferably enclosed within the front inverted frame member 6 thereby to protect the linkage and the respective bearings thereof from the weather, accumulations of dirt, icing in the winter time, and related problems. If desired, end plates 171 (FIG. 1) are removably attached to the ends of the crosspiece, as by bolts whereby access is provided to the inside of the frame members 4, 6. In addition, the box-like structure also conveniently serves as a conduit through which the hydraulic lines to the respective motors and guide wheels are led, and also through which electrical conduits for the hoist motors are led. This is illustrated in FIGS. 7–9 where the hydraulic conduits 126 and 130 are shown being led through the cross piece 30 for the front frame member 6. There it will be observed that the hydraulic conduits 126, 130 are advantageously supported and secured in place within the box structure of the cross piece 30 by means of an internal brace 172 in which holes have been drilled or flame cut for receiving and supporting the respective conduits. Grommets or the like may be supplied for supporting the hydraulic lines in the brace 172 in such a way as to be free of abrasion by the brace. As best seen in FIG. 7, a plurality of braces 172 are supplied. In similar fashion, the hydraulic lines are supported in the vertical depending legs 32, 34 by internal braces 173. The electric wiring for the hoist means (or hydraulic conduit if hydraulic hoist motors are used) are denoted generically as the conduit 174 in FIGS. 7 and 8 and are supported in similar fashion. Appropriate couplings for the various conduits, generically described as 175 in FIG. 9, are provided for leading the respective hydraulic and electric conduits through the walls of the frame member 6 where it is necessary to do so. A similar construction prevails with respect to hydraulic and electric conduits in the rear frame member 4.

The respective connecting rods are advantageously constructed so that their lengths can be adjusted appropriately during the course of assembling the steering linkage. As seen in FIG. 10, each end of the connecting rods and/or the drag link is provided with an eye bolt 180 that threadedly engages the particular connecting rod or link at 182. A lock nut 184 is provided so that any adjustment that is made can be finally set and maintained.

A standard eye bolt spherical bearing 181 (FIGS. 10, 11) is preferably employed between the eye bolt and the pivot stud or bolt 185 in order to compensate for misalignment between pivot points.

The eye bolts form the pivot points between connecting rods and bell cranks in the manner such as shown in FIG. 11, where the hole in the eye bolt is aligned with a corresponding hole in the arm of the bell crank, a bolt 185 is inserted in the hole, a nut 186 is screwed on the other end of the bolt thereby loosely securing the connecting rod, drag link, etc. to the bell crank, and a cotter pin 187 is secured in a hole drilled through the bolt. In this fashion, the turning action will not work the nut off the bolt.

Of course, any suitable or convenient construction may be employed for obtaining the various pivot points and for securing the connecting rods or drag links in a pivotal fashion to their respective bell crank arms.

As best seen in FIG. 1, the hydraulic cylinder 114 and the valve 112 are connected to form a unitary assembly. One such assembly is provided for each of the guide wheels. The piston or ram which moves in and out of the cylinder 114 is advantageously pivotally connected by means of a nut and bolt to a flange bracket 190 which is welded to the bottom side of the stringer. In this fashion, the assembly of 112, 114 can pivot in a horizontal plane about its connection to the bracket. The conduits 130 and 126 for carrying high pressure and exhaust hydraulic fluid are flexible at this point, whereby relative movement can be readily tolerated between the cylinder 114 and the frame member 6 from which the conduits are supported. The opposite end of the assembly of 112, 114 is pivotally connected to the guide wheel bracket 54 by any suitable means, such as a bolt threadedly engaging a capped hole in the upper end of the bracket, as best seen in FIG. 1.

With the just-described suspension of the hydraulic cylinder-valve assembly, relative motion between the assembly and the rest of the straddle truck in order to pivot the guide wheel 52 is achieved. An additional feature provides conventional hydraulic mounting ball-and-socket joints 192, 193 between the valve and the guide wheel bolt 191 and between the piston and the bracket bolt 190. The sockets cooperate with the circular plunger or piston which is connected to the bracket 190 to permit rotation of the cylinder-valve assembly 112, 114 about the longitudinal axis of said assembly, which rotation occurs in response to turning signals initiated by selectively positioning the lever 20 to effect a turn. If preferred a double ball-and-socket (i.e. two in series) is provided as 192, along with socket 193.

*Operation*

A straddle truck built in accordance with the present invention is particularly suitable for straddling, picking up, transporting, and setting down elongated loads which the truck is capable of straddling. The straddle truck is also particularly well adapted for the handling of marine equipment, particularly yachts, motor boats and in some cases sail boats. In doing this a pair of parallel docks are provided, being spaced apart so that the straddle truck can drive down the docks and stop. The hoist motors 40 are operated whereby the slings or belts 46 are dropped down into the water far enough for the boat 2 to be floated over the cables. While the boat is positioned in the water over the cables the hoist motors 40 are again all operated in unison, the boat is lifted out of the water, and after being lifted to a suitable height the hoist motors are shut off and by braking means built therein maintain the position shown in FIG. 2 until such time as it is desired to lower the boat.

The straddle truck with its load is then driven off the piers by applying power to the hydraulic motors 144, 146 which is done by manipulating the directional by-pass valve 142 so the motors drive in the proper direction. The straddle truck while being driven can achieve a speed, for example, of 125 feet per minute. When it is desired to turn the vehicle, the lever 20 is manipulated by the operator, whereupon the steering linkage means responds. The end result of the response is to position the guide wheels 52 as shown for example in FIG. 4 where a right hand turn is under way. It is to be observed that the right hand guide wheel turns to a position tangential to its turning circle which has a radius R1 as seen in FIG. 4. During the time that the right hand guide wheel is moving to the FIG. 4 position, the left hand guide wheel is also moving to a position tangential to a turning circle of larger radius, of radius R2. In assuming these respective positions, the innermost guide wheel travels through a first larger arc 200 while the outermost guide wheel is turned through a horizontal arc 202. The respective guide and drive wheels then proceed to track around the instant center of the turn. The operator brings the vehicle out of the turn by moving the lever 20 to an appropriate position.

It is thus seen that a unique steering mechanism has been provided whereby a differential action is obtained between the guide wheels so they are moved through different horizontal arcs to positions tangential to circles of radii commensurate with the distance of the wheels from the centers of their turn. In doing so, the mechanism is arranged about an inverted U-shaped member and is so constructed that the space between the legs of the inverted U is left completely open and free of any obstructions whereby the vehicle can straddle a load of substantial size, pick up the load and transport it to some predetermined place. The particular steering linkage means provided is movably supported from the inverted U-shaped frame assembly and extends from a guide wheel supported below one leg of the U, around the frame assembly, and to the guide wheel supported below the other leg. In the preferred embodiment, as shown in the figures, a positioning means such as the lever 20 is provided for engaging the steering linkage and for selectively moving the steering linkage to a predetermined position thereby to move the guide wheels through their respective arcs, 200, 202 and to turn the vehicle.

It will also be observed that the disclosed embodiment encompasses a plurality of alternately arranged connecting rods and bell cranks, wherein the respective bell cranks are pivotally supported from the inverted U-shaped frame member. In the described embodiment, it is to be observed that the arms of the bell cranks are disposed slightly more than 90° apart, having an obtuse angle therebetween.

One bell crank is, however, an exception to the obtuse angle rule just stated. That is the central bell crank 74 the arms of which are at an acute angle one with the other. However, the central bell crank is disposed at a particular location with reference to the pivot points of the upper bell cranks 60, 62 which flank it.

Also, in the preferred embodiment, certain of the mechanism is designed to change the plane in which the linkage moves. In the above description, the two lower bell cranks 94, 96 are provided with mutually offset arms to this end, as described in more detail above.

Also, the inverted U-shaped frame with which the steering linkage means is associated is made of a box-like construction whereby the frame work is hollow. That portion of the linkage between the lower bell cranks 94, 96 is disposed within the inverted U-shaped frame member.

In operation, the steering linkage means also has a feature of placing in tension those links between the steering lever 20 and the outside of the turn, having reference to the tension placed on the connecting rods.

A safety feature is incorporated whereby the steering lever 20 is moved away from its neutral position in the same direction that it is desired to turn the vehicle. Viewed as the operator sees it, the lever 20 is moved clockwise for a right hand turn and counter clockwise for a left hand turn. This corresponds to the directions that an automobile steering wheel is turned, and thereby takes advantage of the steering habits accumulated by operators who may also drive automotive vehicles.

In one specific embodiments a straddle truck steering system was constructed having approximately the following dimensions:

| | |
|---|---|
| Tread (distance between wheels 48 or wheels 52) | 16 ft. 8 in. |
| Wheelbase (distance between wheels 48 or wheels 52) | 19 ft. 0 in. |
| Minimum turning radius (R3 of FIG. 4) | 19 ft. 4 in. |
| Angle 200 (FIG. 4) at minimum radius | 44½ degrees. |
| Angle 202 (FIG. 4) at minimum radius | 29½ degrees. |
| Upper bell cranks: | |
|   Obtuse angle | 93 degrees. |
|   Long arm | 9½ in. |
|   Short arm | 5 in. |
| Lower bell cranks: | |
|   Obtuse angle | 94½ degrees. |
|   Long arm | 11 in. |
|   Short arm | 4¼ in. |
| Central bell crank: | |
|   Distance between pivots 80, 81 | 6½ in. |
|   Length of arms 78, 79 | 6¼ in. |
| Length of upper connecting rods 84, 85 between pivots at end | 7 ft. 10½ in. |
| Length of vertical connecting rods 102, 108 between pivots at end | 10 ft. 4¾ in. |

If desired, the linkage can be disposed inside the box-like frame members 4, 6 and the hydraulic and electric lines disposed outside. Alternatively, all can be disposed outside 4, 6.

For even multiples of the tread, wheelbase and minimum turning radius R3, it is permissible to use bell cranks proportioned as above. However, variations in the ratio of tread:wheelbase:radius R3 require different crank proportions which are, for example, determinable by a kinematic and preferably graphic analysis of the system of FIGS. 1 and 5.

As seen in FIGS. 1–3, the corner brackets 12, 14, 36 and 38 are built into the box-like structure of the inverted frame members 4, 6, preferably by welding.

Although the invention has been described with respect to a presently preferred embodiment which has actually been built and tested, it is to be understood that the invention is not restricted to only that which is disclosed in the accompanying drawings and the above description, but that it also extends to those equivalents, substitutions, and modifications which would be obvious to one skilled in the art. For example, it is intended to encompass the application of pulleys and cables to a differential action, as should be evident from the following claims. Also, where bell cranks and connecting rods are employed, it is within the province of the invention to have various types of symmetry and non-symmetry and also to have various proportions of the arms and of the angular disposition between the arms of the respective bell cranks.

I claim:

1. Vehicle steering apparatus for a self-propelling vehicle having motor means drivingly connected to a ground-engaging traction means, said apparatus comprising in combination a frame assembly having at one end an inverted U-shaped frame member supported in a vertical position, said frame member having first and second depending legs connected only at the top by a cross piece;

first and second guide wheels each respectively supported below said first and second legs to revolve in a generally horizontal arc;

steering linkage means, movably supported from said frame assembly and extending from said first guide wheel along said first leg, said cross piece, and along said second leg to said second guide wheel thereby leaving substantially unobstructed the space between said legs, said steering linkage means including a pivoted plate means having a cross piece connected to the linkage means in the first and second legs of said frame assembly for revolving both said guide wheels through respective horizontal arcs to respective positions tangential to circles having respective radii representative of the distances of said guide wheels from their common instant center, thereby turning said vehicle with a differential action between said guide wheels;

and positioning means for engaging said steering linkage means and for selectively moving said steering linkage means to a predetermined position thereby turning said vehicle.

2. Vehicle steering apparatus for a self-propelling vehicle having motor means drivingly connected to a ground-engaging traction means, said apparatus comprising in combination a frame assembly having at one end an inverted U-shaped frame member supported in a vertical position, said frame member having first and second depending legs connected only at the top by a cross piece;

first and second guide wheels each respectively supported below said first and second legs to revolve in a generally horizontal arc;

steering linkage means, movably supported from said frame assembly and extending from said first guide wheel along said first leg, said cross piece, and along said second leg to said second guide wheel thereby leaving substantially unobstructed the space between said legs, said steering linkage means including triangular means mounted on said cross piece to pivot about its apex and having its base vertices connected to the linkage means to impart differential motion to the linkage means in the first and second legs of said frame assembly for revolving both said guide wheels in unison during turning of said vehicle through respective horizontal arcs wherein the guide wheel on the inside of the turn assumes a position tangential to a first turning circle and the guide wheel on the outside of the turn assumes a position tangential to a circle of greater radius than said first turning circle thereby turning said vehicle with a differential action between said guide wheels;

and selectively controllable positioning means for engaging said steering linkage means and for selectively moving said guide wheels through said steering linkage means to their respective tangential positions thereby turning said vehicle.

3. A steerable and self-propelled straddle truck comprising in combination a frame assembly including a pair of inverted U-shaped members each having a horizontally extending cross piece with a leg depending vertically from each end of said cross piece, longitudinal stringers extending horizontally from one inverted frame member to the other thereby spacing apart said frame members, a drive wheel supported below each leg of one of said frame members in a position to drive the straddle truck in a direction corresponding to said stringers, all in such combination that the area defined between said stringers and the legs of said frame members is unobstructed;

motor means supported from said frame assembly;

means for drivingly connecting each of said driving wheels with said motor means;

a first and a second guide wheel each respectively supported below the depending legs of the other of said inverted U-shaped members;

steering linkage means, movably supported from said frame assembly and extending from said first guide wheel to the other of said inverted U-shaped members and along one leg, the cross piece and the other leg of said member to said second guide wheel thereby leaving substantially unobstructed the space between said legs, said steering linkage means including bell crank means having equal length legs and pivotally mounted on said cross piece with the linkage means connected to the ends of each of its legs for imparting differential motion to the linkage means in the first and second legs of said frame assembly, said steering linkage means revolving both said guide wheels in unison during turning of said vehicle through respective horizontal arcs wherein the guide wheel on the inside of the turn assumes a position tangential to a first turning circle and the guide wheel on the outside of the turn assumes a position tangential to a circle of greater radius than said first turning circle, thereby turning said vehicle with a differential action between said guide wheels;

and selectively positionable control means for engaging said steering linkage means and for selectively moving said guide wheels through said linkage means to their respective tangential positions thereby turning said vehicle.

4. Vehicle steering apparatus for a self-propelled vehicle having motor means drivingly connected to a ground-engaging traction means, said apparatus comprising in combination a frame assembly having at one end an inverted U-shaped frame member supported in a vertical position, said frame member having first and second depending legs connected only at the top by a cross piece;

first and second guide wheels each respectively supported below said first and second legs to revolve in a generally horizontal arc;

steering linkage means including a plurality of series-connected links movably supported from said frame member and extending longitudinally thereof along said first leg, said cross piece, and along said second leg thereby leaving substantially unobstructed the space between said leg and said cross piece, said steering linkage means further including connecting means disposed adjacent the lower end of each leg for connecting respective terminal ones of said links to said first and second guide wheels for revolving both said guide wheels in unison during turning of said vehicle through respective horizontal arcs, said steering linkage means including isoceles triangulation means mounted to pivot about its apex and having its base vertices connected to the linkage means to impart differential motion to the linkage means in the first and second legs of said frame assembly wherein the respective guide wheels are each moved to a position tangential to the turning circle for each wheel, the radius of the turning circle for the wheel on the inside of the turn being smaller than that of the other of said guide wheels, whereby said vehicle is turned with a differential action between said guide wheels;

and selectively controllable positioning means for engaging said steering linkage means and for selectively moving said guide wheels through said steering linkage means to their respective tangential positions thereby turning said vehicle.

5. Vehicle steering apparatus for a self-propelled vehicle having hydraulic motor means drivingly connected to a ground-engaging traction means, said apparatus comprising in combination a frame assembly having at one end an inverted U-shaped frame member supported in a vertical position, said frame member having first and second depending legs connected only at the top by a cross piece;

first and second guide wheels each respectively supported below said first and second legs to revolve in a generally horizontal arc;

steering linkage means including a plurality of series-connected links movably supported from said frame member and extending longitudinally thereof along said first leg, said cross piece, and along said second leg thereby leaving substantially unobstructed the space between said legs and said cross piece, said steering linkage means further including connecting means disposed adjacent the lower end of each leg for connecting respective terminal ones of said links to said first and second guide wheels for revolving both said guide wheels in unison through respective horizontal arcs during turning of said vehicle, said steering linkage means including a triangular bell crank means pivotally mounted on the cross piece and connected to the linkage means within the cross piece, whereby the respective guide wheels are each moved to a position tangential to the turning circles for each wheel, the radius of the turning circle for the wheel on the inside of the turn being smaller than that of the other of said guide wheels, whereby said vehicle is turned with a differential action between said guide wheels;

and positioning means engaging said steering linkage means for selectively moving said guide wheels in response to corresponding movement of said steering means by placing predetermined ones of said links in tension, said predetermined links being those connected between said positioning means and said connecting means.

6. Vehicle steering apparatus for a self-propelled vehicle having motor self-propelling means drivingly connected to a ground-engaging traction means, said apparatus comprising in combination a frame assembly having at one end an inverted U-shaped frame member supported in a vertical position, said frame member having first and second depending legs connected only at the top by a cross piece;

first and second guide wheels each respectively supported below said first and second legs to revolve in a generally horizontal arc;

steering linkage means, movably supported from said frame assembly and extending from said first guide wheel along said first leg, said cross piece, and along said second leg to said second guide wheel thereby leaving substantially unobstructed the space between said legs for revolving both said guide wheels in unison during turning of said vehicle through respective horizontal arcs, said steering linkage means including symmetrical triangular bell crank means pivotally mounted on said cross piece and having its base corners connected to the linkage means for imparting differential motion to the linkage means in the first and second legs of said frame member wherein the guide wheel on the inside of the turn assumes a position tangential to a first turning circle and the guide wheel on the outside of the turn assumes a position tangential to a circle of greater radius than said first turning circle thereby turning said vehicle with a differential action between said guide wheels;

and positioning means engaging said steering linkage means for selectively moving said guide wheels as defined above by turning said guide wheels for a right hand turn responsive to a motion to the right of said positioning means, and for turning said guide wheels for a left hand turn responsive to a motion to the left of said positioning means.

7. Vehicle steering apparatus for a self-propelled vehicle having motor means drivingly connected to a ground-engaging traction means, said apparatus comprising in combination a frame assembly having at one end an inverted U-shaped frame member supported in a vertical position, said frame member having first and second depending legs connected only at the top by a cross piece;
first and second guide wheels each respectively supported below said first and second legs to revolve in a generally horizontal arc;
a plurality of series-connected links disposed to extend longitudinally, respectively, of said first and second legs and said cross piece;
support means for movably supporting said links from said inverted frame member and for changing the direction of the motion of said links at the respective opposite ends of said first and second depending legs; said support means including triangular means pivotally mounted on said cross piece and having its base vertices connected to the linkage means whereby on pivotal motion of said triangular means a differential motion will be imparted to said links at the respective ends of said first and second depending legs;
connecting means at the lower ends of each leg for connecting respective ones of said links to said first and second wheels and to translate motion of said links and supports into corresponding turning motion of said first and second wheels, respectively;
and positioning means for engaging the combination of said support means and said links and for selectively moving said guide wheels through the combination of said links, support means, and connecting means to positions tangential with the respective turning circles of said first and second guide wheels, thereby to turn said vehicle.

8. Vehicle steering apparatus for a self-propelled straddle truck having motor means drivingly connected to ground-engaging traction means, said apparatus comprising in combination
a frame assembly closed along the sides and open at the ends with inverted U-shaped frame members at each end supported in a vertical position, one of said frame members being at the steering end of said frame assembly and further including first and second depending legs connected at the top by a cross piece leaving substantially unobstructed the space between said legs and thus creating said open ends feature;
first and second guide wheels each respectively supported below said first and second legs to revolve in respective generally horizontal arcs;
a steering means including a plurality of bell cranks and rigid connecting rods extending between the respective bell cranks, with the bell cranks being pivotally supported from said frame member at the steering end, said bell cranks being disposed to support said rods to leave substantially unobstructed the space between said legs, one of said bell cranks having arms of equal length and angular relationship to each other and being pivotally connected to said frame so that in steering said vehicle the guide wheel on the inside of the turn is disposed tangential to a circle of smaller radius than the radius of the turning circle of the other said guide wheel;
means for connecting said steering means at each end thereof to said first and second guide wheels, respectively; and
positioning means for engaging said steering means and selectively moving the same to position said guide wheels at the respective tangential positions in the course of turning said vehicle.

9. A vehicular steering apparatus in accordance with claim 8 wherein said pivotal connection of said one of said bell cranks is in the central region of said cross piece, said pivot being disposed above a line drawn through the pivot points of the bell cranks disposed on each side thereof.

10. A vehicular steering system for a self-propelled straddle truck having a pair of longitudinally spaced-apart inverted U-shaped frame members with a pair of drive wheels drivingly connected to a motor means, said drive wheels supporting the vehicle adjacent the legs of one of said frame members and a pair of horizontally revolvable guide wheels supporting the vehicle adjacent the legs of the other of said frame members and connected to said steering system, said system comprising
first and second like-constructed bell cranks pivotally supported in mirror image relationship from said other inverted U-shaped member adjacent the intersections of the cross piece and legs of said member, said bell cranks each having two arms of respectively different radii and having an obtuse angle between the arms thereof;
a third bell crank pivotally supported from said cross piece intermediate said first and second bell cranks, said third bell crank having an acute angle between the arms thereof and the arms being of equal radii;
first and second connecting rods each revolvably connected at each end to one arm of said bell cranks, said first rod extending between one arm of said first bell crank and the adjacent arm of said third bell crank and said second rod extending between one arm of said second bell crank and the other arm of said third bell crank;
fourth and fifth like-constructed bell cranks respectively pivotally supported in mirror image relationship adjacent the bottom of the respective legs of said other inverted U-shaped member and respectively vertically beneath said first and second bell cranks, said fourth and fifth bell cranks each having two arms of different radii disposed with an obtuse angle between such two arms;
a third connecting rod revolvably connected at one end to the other arm of said first bell crank and revolvably connected at the other end to an arm of said fourth bell crank;
a fourth connecting rod revolvably connected at one end to the other arm of said second bell crank and revolvably connected at the other end to an arm of said fifth bell crank;
first and second means for positioning, respectively, each of said guide wheels responsive to the position of the other arm of said fourth and fifth bell cranks respectively;
and selective steering means, connected to the system defined by the above-said bell cranks and connecting rods, for selectively positioning the system thereby to position said guide wheels and to steer said vehicle, said guide wheels being positioned away from the neutral or straight-ahead position to tangential relation with circles having radii representative distances of said guide wheels from the common instant center of the turn whereby said system provides a differential action between the respective guide wheels.

11. A vehicular steering system in accordance with claim 10 wherein said first, second, and third bell cranks are supported to pivot in a plane substantially parallel to the plane defined by said other inverted U-shaped member and wherein said fourth and fifth bell cranks are supported to pivot through planes intersecting the plane defined by said inverted U-shaped member.

12. A steering apparatus in accordance with claim 10 wherein said first and second means for positioning each of said guide wheels comprises a hydraulic cylinder, a hydraulic valve for receiving a constant flow of hydraulic fluid and directing it either to a hydraulic fluid reservoir or to a selected end of the respective hydraulic cylinder, and a drag link connected between said valves for said first means and said fourth bell crank and another drag link connected between said second means for positioning and said fifth bell crank, whereby said cylinders turn said guide wheel responsive to positioning of said valves by selective movement of said bell cranks and connecting rod in order to steer said vehicle.

13. A vehicular steering system for a self-propelled straddle truck having a pair of longitudinally spaced-apart inverted U-shaped frame members with a pair of drive wheels drivingly connected to self-propelling means, said drive wheels supporting the vehicle adjacent the legs of one of said frame members and a pair of horizontally revolvable guide wheels supporting the vehicle adjacent the legs of the other of said frame members and connected to said steering system, said system comprising first and second like-constructed bell cranks pivotally supported in mirror image relationship from said other inverted U-shaped member adjacent the intersections of the cross piece and legs of said member, said bell cranks each having two arms of respectively different radii and having an obtuse angle between the arms thereof;

a third bell crank pivotally supported from said cross piece intermediate said first and second bell cranks, said third bell crank having an acute angle between the arms thereof and the arms being of equal radii;

first and second connecting rods each revolvably connected at each end to one arm of said bell cranks, said first rod extending between one arm of said first bell crank and the adjacent arm of said third bell crank and said second rod extending between one arm of said second bell crank and the other arm of said third bell crank;

fourth and fifth like-constructed bell cranks respectively pivotally supported in mirror image relationship adjacent the bottom of the respective legs of said other inverted U-shaped member and respectively vertically beneath said first and second bell cranks, said fourth and fifth bell cranks each having two arms of different radii disposed with an obtuse angle between such two arms;

a third connecting rod revolvably connected at one end to the other arm of said first bell crank and revolvably connected at the other end to an arm of said fourth bell crank;

a fourth connecting rod revolvably connected at one end to the other arm of said second bell crank and revolvably connected at the other end to an arm of said fifth bell crank;

first and second means for positioning, respectively, each of said guide wheels responsive to the position of the other arm of said fourth and fifth bell cranks respectively;

and selective steering means, connected to the system defined by one above-said bell cranks and connecting rods, for selectively positioning the system thereby to position said guide wheels and to steer said vehicle in response to which said guide wheels are each positioned away from the neutral or straight-ahead position to a tangential relation with its turning circle whereby said system provides a differential action between the respective guide wheels;

said other inverted U-shaped member being hollow throughout and enclosing said first, second, third and fourth connecting rods and said first, second, and third bell cranks.

14. A vehicular steering apparatus in accordance with claim 8 wherein said pivotal connection of said one of said bell cranks is located in the central region of said cross piece, said pivot being disposed above a line drawn through the pivot points of the bell cranks disposed on each side thereof said inverted U-shaped frame being hollow throughout and enclosing the rigid rods and bell cranks disposed in the cross piece and enclosing the rigid rods disposed in the depending legs.

References Cited in the file of this patent
UNITED STATES PATENTS

| | | |
|---|---|---|
| 2,073,032 | Stimson | Mar. 9, 1937 |
| 2,191,961 | Howell | Feb. 27, 1940 |
| 2,438,534 | Bowers | Mar. 30, 1948 |
| 2,909,298 | Baudhuin | Oct. 20, 1959 |
| 3,028,925 | Baudhuin et al. | Apr. 10, 1962 |
| 3,075,603 | Baudhuin | Jan. 29, 1963 |

FOREIGN PATENTS

| | | |
|---|---|---|
| 661,369 | France | Mar. 4, 1929 |